United States Patent
Wu et al.

(10) Patent No.: US 11,385,688 B2
(45) Date of Patent: Jul. 12, 2022

(54) ELECTRONIC APPARATUS

(71) Applicants: Chia-Hua Wu, Taipei (TW); Ching-Tai Chang, Taipei (TW)

(72) Inventors: Chia-Hua Wu, Taipei (TW); Ching-Tai Chang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 17/237,065

(22) Filed: Apr. 22, 2021

(65) Prior Publication Data

US 2022/0107665 A1    Apr. 7, 2022

Related U.S. Application Data (60) Provisional application No. 63/125,352, filed on Dec. 14, 2020, provisional application No. 63/024,458, filed on May 13, 2020.

(51) Int. Cl.
 *G06F 1/16*    (2006.01)

(52) U.S. Cl.
 CPC ............ *G06F 1/169* (2013.01); *G06F 1/1656* (2013.01); *G06F 1/1616* (2013.01)

(58) Field of Classification Search
 CPC ....... G06F 1/1616; G06F 1/1656; G06F 1/169
 See application file for complete search history.

(56) References Cited

U.S. PATENT DOCUMENTS

| | | | | |
|---|---|---|---|---|
| 1,035,483 | A * | 8/1912 | Scott | A45C 13/22 16/406 |
| 5,222,897 | A * | 6/1993 | Collins | H05K 7/1409 361/801 |
| 7,425,948 | B2 * | 9/2008 | Ling | G06F 3/03545 248/688 |
| 8,054,613 | B2 * | 11/2011 | Hsu | F16M 13/005 361/679.01 |
| 8,203,543 | B2 * | 6/2012 | Chen | G06F 1/1656 345/179 |
| 8,692,813 | B2 * | 4/2014 | Yeh | G06F 3/03545 345/179 |
| 8,867,201 | B2 * | 10/2014 | Lin | G06F 1/1656 361/679.04 |

(Continued)

FOREIGN PATENT DOCUMENTS

| | | |
|---|---|---|
| TW | M461295 | 9/2013 |
| TW | M566855 | 9/2018 |

(Continued)

OTHER PUBLICATIONS

"Office Action of Taiwan Counterpart Application", dated Oct. 12, 2021, p. 1-p. 7.

*Primary Examiner* — Adrian S Wilson
(74) *Attorney, Agent, or Firm* — JCIPRNET (57) ABSTRACT

An electronic apparatus including an apparatus body and a functional assembly is provided. The apparatus body has a concave. The functional assembly includes a main body and an axle. The axle is slidably disposed in the main body, and a part of the axle is adapted to protrude out of the main body to be combined with the concave. When the part of the axle is combined with the concave, the main body is adapted to rotate relative to the apparatus body by treating the axle as a rotation axis.

19 Claims, 12 Drawing Sheets

(56) References Cited

U.S. PATENT DOCUMENTS

| | | | | |
|---|---|---|---|---|
| 9,025,318 | B2* | 5/2015 | Ashcraft | G06F 1/26 361/679.01 |
| 9,110,629 | B2* | 8/2015 | Leung | G06F 3/03545 |
| 9,170,662 | B2* | 10/2015 | Kim | G06F 1/1626 |
| 9,436,222 | B2* | 9/2016 | Lee | G06F 1/1698 |
| 9,785,204 | B1* | 10/2017 | Miller | H04M 1/185 |
| 9,904,319 | B2* | 2/2018 | Lukic | G06F 1/166 |
| 10,153,077 | B2* | 12/2018 | Barel | G06F 3/04883 |
| 10,415,748 | B2* | 9/2019 | Wang | G03B 15/041 |
| 10,649,548 | B2 | 5/2020 | Pirie et al. | |
| 10,750,844 | B2* | 8/2020 | Peterson | A45F 5/00 |
| 10,754,374 | B2* | 8/2020 | Casey | F16M 11/06 |
| 10,802,617 | B2* | 10/2020 | Lin | G06F 3/03545 |
| 11,116,120 | B2* | 9/2021 | Chi | H01R 13/6205 |
| 2004/0160431 | A1* | 8/2004 | DiMambro | G06F 3/03545 345/179 |
| 2006/0044288 | A1* | 3/2006 | Nakamura | G06F 3/03545 345/179 |
| 2007/0002550 | A1* | 1/2007 | Strmiska | H05K 7/1409 361/798 |
| 2010/0219217 | A1* | 9/2010 | Andochick | A45F 5/02 224/250 |
| 2011/0188184 | A1* | 8/2011 | Hsu | H05K 5/00 361/679.01 |
| 2012/0146913 | A1* | 6/2012 | Linn | G06F 1/1643 345/169 |
| 2014/0029182 | A1* | 1/2014 | Ashcraft | G06F 3/03545 361/679.4 |
| 2014/0049894 | A1* | 2/2014 | Rihn | G06F 1/1616 335/219 |
| 2016/0036478 | A1* | 2/2016 | Wong | F16M 13/022 455/573 |
| 2016/0230924 | A1* | 8/2016 | Chen | G06F 1/166 |
| 2016/0277835 | A1* | 9/2016 | Kim | G06F 1/1688 |
| 2017/0336827 | A1* | 11/2017 | Lukic | G06F 1/1633 |
| 2018/0292866 | A1* | 10/2018 | Tucker | G06F 1/1686 |
| 2020/0288609 | A1* | 9/2020 | Chi | H05K 13/0413 |
| 2021/0039563 | A1* | 2/2021 | Yashwanth Theriyur Srinivassharma | F16M 11/14 |

FOREIGN PATENT DOCUMENTS

| | | |
|---|---|---|
| TW | I655562 | 4/2019 |
| TW | M580210 | 7/2019 |
| TW | I683241 | 1/2020 |

* cited by examiner

ELECTRONIC APPARATUS

CROSS-REFERENCE TO RELATED APPLICATION

This application claims the priority benefit of U.S. Provisional Application No. 63/024,458, filed on May 13, 2020, and U.S. Provisional Application No. 63/125,352, filed on Dec. 14, 2020. The entirety of each of the above-mentioned patent applications is hereby incorporated by reference herein and made a part of this specification.

BACKGROUND

Technical Field

The disclosure relates to an electronic apparatus, and particularly relates to an electronic apparatus that uses a concave of an apparatus body to connect a functional assembly.

Description of Related Art

Along with development of touch technology, many electronic apparatuses may be used together with styluses for implementation of touch input. In the case of notebook computers, in order to allow styluses to be stored or to be combined with apparatus bodies when the styluses are not in use, some notebook computers are designed to allow the styluses to be fixed to the side of hosts by means of magnetic attraction or snap-fitting. However, a stylus fixed to the side of the host may block the connector slot of the host, leading to inconvenience in use as a result.

SUMMARY

The disclosure is directed to an electronic apparatus in which an apparatus body is not blocked by a functional assembly such that inconvenience in use is prevented.

The disclosure provides an electronic apparatus including an apparatus body and a functional assembly. The apparatus body has a concave. The functional assembly includes a main body and an axle. The axle is slidably disposed in the main body, and a part of the axle is adapted to protrude out of the main body to be combined with the concave. When the part of the axle is combined with the concave, the main body is adapted to rotate relative to the apparatus body by treating the axle as a rotation axis.

In an embodiment of the disclosure, the concave is an anti-theft lock hole of the apparatus body.

In an embodiment of the disclosure, the functional assembly is a stylus, a camera apparatus, or a flash drive.

In an embodiment of the disclosure, the main body includes a main housing and a base, the base is fixed to the main housing, and the axle is rotatably arranged in the base and is adapted to protrude from the base.

In an embodiment of the disclosure, the main body has at least one opening. The axle is adapted to protrude from the main body through the at least one opening, and the axle has a stop portion. An outer diameter of the stop portion is larger than an aperture of the at least one opening to prevent the axle from being separated from the main body.

In an embodiment of the disclosure, a material of one of the concave and the axle includes a magnet, and a material of the other one of the concave and the axle includes a magnet or a metal that is adapted to be magnetically attracted.

In an embodiment of the disclosure, the functional assembly includes a first suction member, which is suitable for magnetically attracting the axle. A material of the first suction member includes a magnet or a metal that is adapted to be magnetically attracted, and a magnetic attraction force between the first suction member and the axle is less than a magnetic attraction force between the concave and the axle.

In an embodiment of the disclosure, the functional assembly includes a pen holder, the pen holder is slidably arranged on the main body, and the first suction member is connected to the pen holder and is suitable for being aligned or misaligned with the axle along as the pen holder relatively slides along the main body.

In an embodiment of the disclosure, the first suction member is arranged on a main housing of the main body, and when the axle is away from the concave, the axle and the first suction member are magnetically attracted to each other.

In an embodiment of the disclosure, the electronic apparatus includes a second suction member. The second suction member is disposed on the apparatus body, the functional assembly includes a third suction member, the third suction member is disposed on the main body, and the second suction member and the third suction member are magnetically attracted to each other. When the axle is combined with the concave, the main body is adapted to rotate by treating the axle as a rotation axis such that the second suction member and the third suction member are aligned or misaligned with each other.

In an embodiment of the disclosure, the main body includes a pen body and a pen cap. The pen body has a pen tip end and a pen tail end, and the pen cap is selectively sleeved on one of the pen tip end and the pen tail end. If the axle is arranged on the pen body, a position of the third suction member is adjacent to the pen tip end, and if the axle is disposed on the pen cap, the position of the third suction member is adjacent to the pen tail end.

In an embodiment of the disclosure, the functional assembly includes an elastic member. The elastic member is arranged between the main body and the axle, the axle is adapted to resist an elastic force of the elastic member to protrude out of the main body, and the axle is adapted to be reset into the main body through the elastic force of the elastic member.

In an embodiment of the disclosure, the main body has two opposite openings, and the axle is adapted to protrude out of the main body through any one of the two openings.

In an embodiment of the disclosure, the functional assembly includes a positioning member. The positioning member is disposed in the base, the axle has a plurality of positioning concaves, and the axle is adapted to rotate relative to the main body, such that any one of the positioning concaves is positioned to the positioning member to fix a relative rotation angle between the axle and the main body.

In an embodiment of the disclosure, a material of the positioning member includes an elastic material.

In an embodiment of the disclosure, the axle includes a protruding section, a neck section, and a positioning section. The neck section is connected between the protruding section and the positioning section, the protruding section is adapted to protrude out of the main body, the positioning concaves are formed in the positioning section, and an outer diameter of the neck section is smaller than an outer diameter of the protruding section and an outer diameter of the positioning section.

In an embodiment of the disclosure, the main body has an opening. The protruding section is adapted to protrude from the main body through the opening, a length of the protruding section is less than or equal to a length of the opening and greater than a width of the opening, and a width of the protruding section is less than or equal to the width of the opening.

In an embodiment of the disclosure, the main body has an opening. The protruding section is adapted to protrude from the main body through the opening, and an outer diameter of the positioning section is larger than an aperture of the at least one opening to prevent the axle from being separated from the main body.

In an embodiment of the disclosure, the axle has a concession concave. When the concession concave corresponds to the positioning member along with relative rotation of the axle and the main body, the axle is adapted to slide between the inside of the main body and the outside of the main body.

Based on the above, in the electronic apparatus of the disclosure, the functional assembly is rotatably connected to the concave of the apparatus body via the axle. Accordingly, when the functional assembly is connected to the apparatus body and blocks a functional part (such as a connector slot) of the apparatus body, a user may rotate the functional assembly relative to the apparatus body to allow the functional part not to be blocked by the functional assembly without separating the functional assembly from the apparatus body, so as to avoid the inconvenience in use due to that the apparatus body is blocked by the functional assembly.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
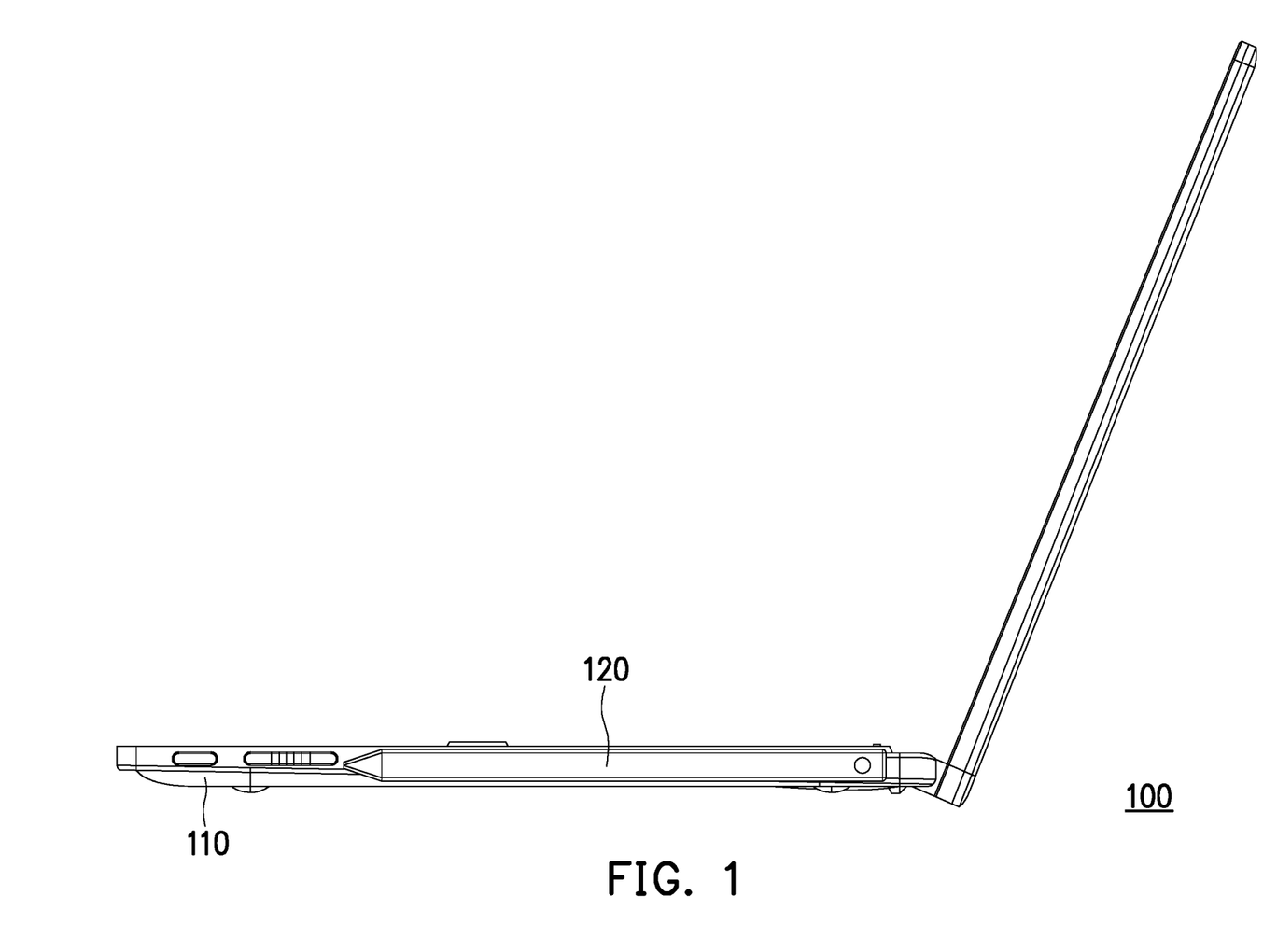
FIG. 1 is a side view of an electronic apparatus according to a first embodiment of the disclosure.
Figure 2:
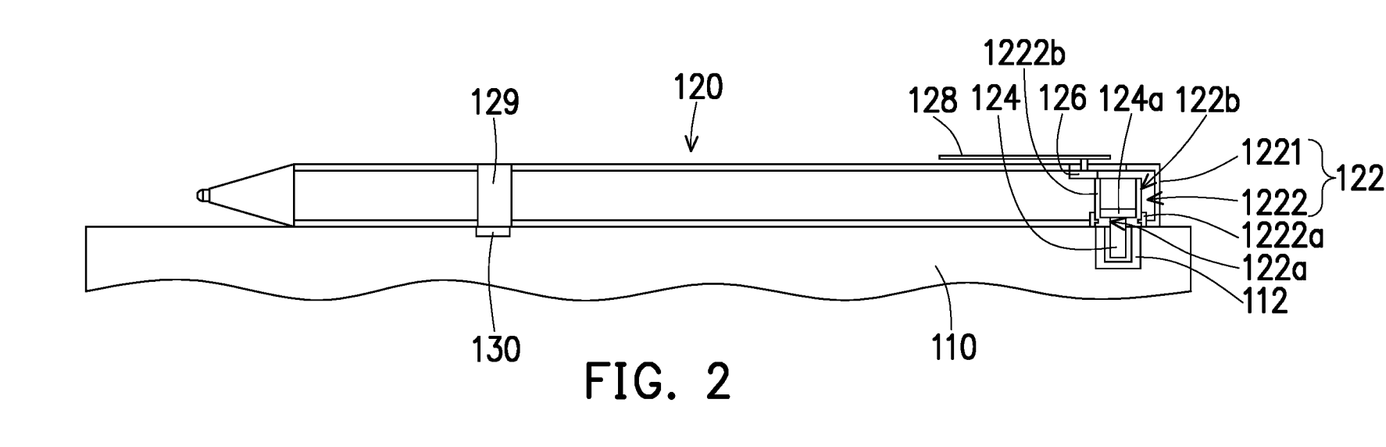
FIG. 2 is a partial schematic top view of the electronic apparatus of FIG. 1.
Figure 3:
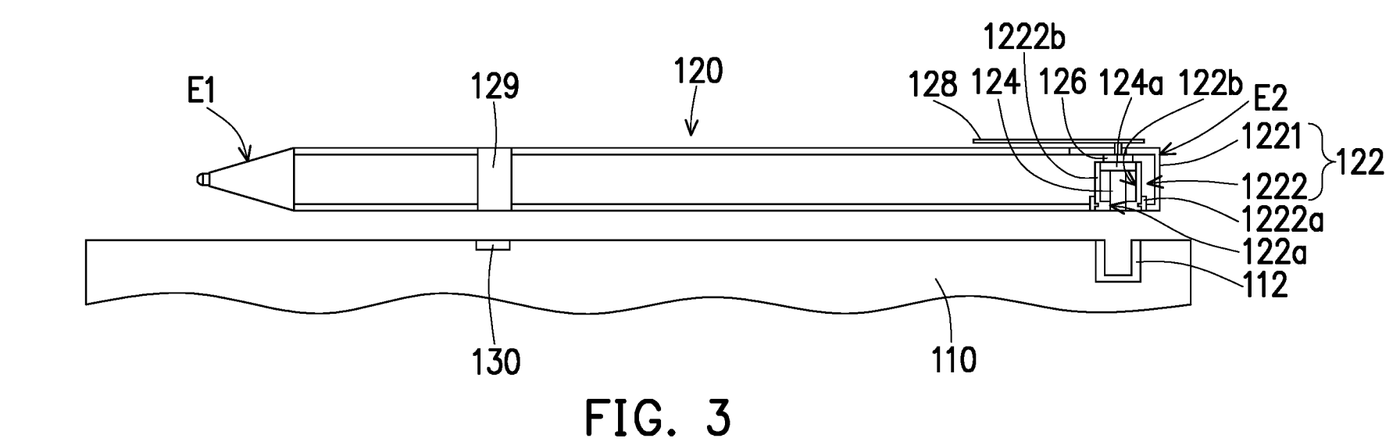
FIG. 3 illustrates separation of a functional assembly from an apparatus body of FIG. 2.

FIG. 1 is a side view of an electronic apparatus according to a first embodiment of the disclosure. FIG. 2 is a partial schematic top view of the electronic apparatus of FIG. 1. FIG. 3 illustrates separation of a functional assembly from an apparatus body of FIG. 2. Referring to FIG. 1 to FIG. 3, an electronic apparatus 100 of this embodiment includes an apparatus body 110 and a functional assembly 120. The apparatus body 110 is, for example, a main body of a notebook computer and has a concave 112 (shown in FIG. 2 and FIG. 3). The concave 112 is, for example, an existing anti-theft lock hole of the notebook computer. The functional assembly 120 is, for example, a stylus and includes a main body 122 and an axle 124. The axle 124 is slidably disposed in the main body 122, and a part of the axle 124 is adapted to protrude out of the main body 122 as shown in FIG. 2 to be combined with the concave 112 of the apparatus body 110.

In other embodiments, the apparatus body 110 may be a tablet computer, a smart phone, etc., and the type thereof is not limited by the disclosure. In addition, in other embodiments, the functional assembly 120 may be a camera apparatus, a flash drive, etc., and the type thereof is not limited by the disclosure.

Figure 4:
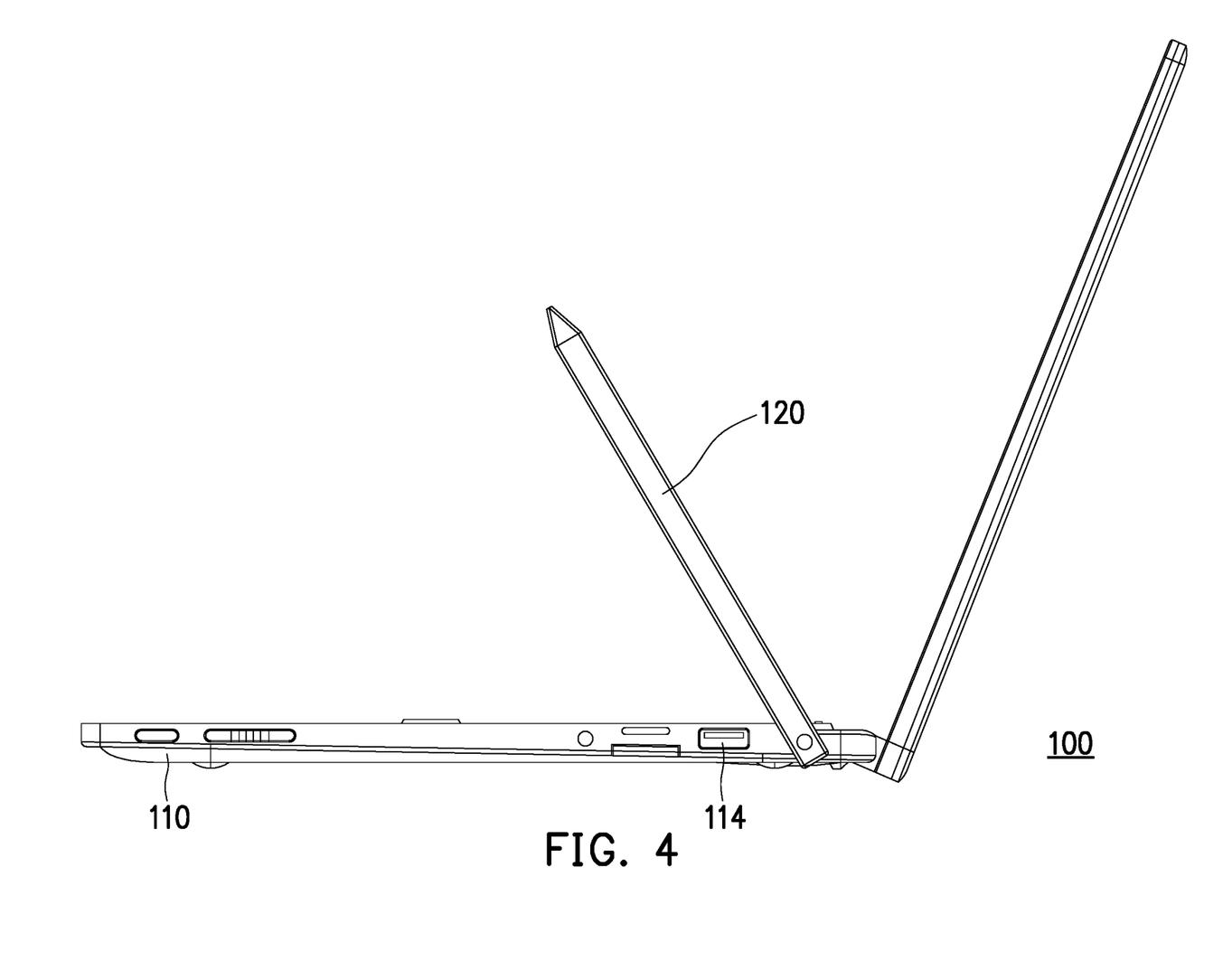
FIG. 4 illustrates rotation of the functional assembly of FIG. 1.

FIG. 4 illustrates rotation of the functional assembly of FIG. 1. When the part of the axle 124 of the functional assembly 120 is combined with the concave of the apparatus body 110 as shown in FIG. 2, the main body 122 of the functional assembly 120 is adapted to rotate relative to the apparatus body 110 by treating the axle 124 as a rotation axis as shown in FIG. 4. Accordingly, when the functional assembly 120 is connected to the apparatus body 110 and blocks a functional part (such as a connector slot 114, shown in FIG. 4) of the apparatus body 110 as shown in FIG. 1, a user may rotate the functional assembly 120 relative to the apparatus body 110 to prevent the functional part from being blocked by the functional assembly 120 without separating the functional assembly 120 from the apparatus body 110, so as to avoid the inconvenience in use due to that the apparatus body 110 is blocked by the functional assembly 120.

In this embodiment, a material of one of the concave 112 of the apparatus body 110 and the axle 124 of the functional assembly 120 may include a magnet, and a material of the other one of the concave 112 of the apparatus body 110 and the axle 124 of the functional assembly 120 may include a magnet or a metal that may be magnetically attracted (such as iron, cobalt, nickel, etc.). Therefore, through the magnetic attraction between the concave 112 and the axle 124, the axle 124 may be combined with the concave 112 of the apparatus body 110 as shown in FIG. 2. In order to prevent electronic components in the apparatus body 110 from being interfered by a magnetic field, a material of the concave 112 of the apparatus body 110 may be metal (for example, the anti-theft lock hole made of an existing metal material existing of the notebook computer) instead of a magnet. However, in the case that the apparatus body 110 itself has a design to shield magnetic field interference, the material of the concave 112 of the apparatus body 110 may be a magnet.

Further, in this embodiment, the functional assembly 120 includes a pen holder 128, and the pen holder 128 is slidably disposed on the main body 122 of the functional assembly 120. The functional assembly 120 further includes a first suction member 126. The first suction member 126 is connected to the pen holder 128 and may be aligned with the axle 124 as shown in FIG. 3 or misaligned with the axle 124 as shown in FIG. 2 as the pen holder 128 slides relatively along the main body 120. If the material of the axle 124 is a magnet, a material of the first suction member 126 may be a magnet or a metal that may be magnetically attracted (such as iron, cobalt, nickel, etc.), if the material of the axle 124 is a metal that may be magnetically attracted (such as iron, cobalt, nickel, etc.), the material of the first suction member 126 may be a magnet.

When the first suction member 126 is aligned with the axle 124 as shown in FIG. 3, it may magnetically attract the axle 124 to prevent the axle 124 from unexpectedly protruding out of the main body 122. The user may apply a force to the pen holder 128 to move the pen holder 128 from a position shown in FIG. 3 to a position shown in FIG. 2, such that the first suction member 126 and the axle 124 are misaligned with each other, and a part of the axle 124 may protrude out of the main body 122 as shown in FIG. 2 and be combined with the concave 112. In this embodiment, a magnetic attraction force between the first suction member 126 and the axle 124 is, for example, less than a magnetic attraction force between the concave 112 and the axle 124. That is, the magnetic attraction force between the concave 112 and the axle 124 is relatively large, so that the axle 124 may easily protrude out of the main body 122 to be combined with the concave 112.

In addition, in this embodiment, the electronic apparatus 100 further includes a second suction member 130, and the second suction member 130 is disposed on the apparatus body 110. Accordingly, the functional assembly 120 includes a third suction member 129, and the third suction member 129 is disposed on the main body 122. A material of one of the second suction member 130 and the third suction member 129 may be a magnet, and a material of the other one of the second suction member 130 and the third suction member 129 may be a magnet or a metal that may be magnetically attracted (such as iron, cobalt, nickel, etc.).

When the axle 124 of the functional assembly 120 is combined with the concave 112 of the apparatus body 110 as shown in FIG. 2, the main body 122 of the functional assembly 120 is adapted to rotate to a state shown in FIG. 1 by treating the axle 124 as a rotation axis, such that the second suction member 130 and the third suction member 129 are aligned with each other. At this time, the second suction member 130 and the third suction member 129 may be magnetically attracted to each other to prevent the functional assembly 120 from unexpectedly rotating relative to the apparatus body 110. Moreover, when the axle 124 of the functional assembly 120 is combined with the concave 112 of the apparatus body 110 as shown in FIG. 2 and the main body 122 of the functional assembly 120 rotates to a state shown in FIG. 4 by treating the axle 124 as the rotation axis, the second suction member 130 and the third suction member 129 are misaligned with each other.

Referring to FIG. 2 and FIG. 3, in the functional assembly 120 of this embodiment, the main body 122 includes a main housing 1221 and a base 1222. The base 1222 is fixed to the main housing 1221, and the axle 124 is rotatably disposed in the base 1222. The base 1222 of the main body 122 has an opening 122a, and the axle 124 is adapted to protrude from the base 1222 of the main body 122 through the opening 122a as shown in FIG. 2. In addition, the axle 124 has a stop portion 124a, and an outer diameter of the stop portion 124a is larger than an aperture of the opening 122a to prevent the axle 124 from being separated from the base 1222 of the main body 122.

It should be noted that according to the size and length of the functional assembly, a position of the third suction member may be relatively far away from the base and the axle to maintain an appropriate distance, which may effectively prevent the functional assembly from unexpectedly rotating relative to the apparatus body. Taking FIG. 2 and FIG. 3 as an example, the main housing 1221 itself is a pen body with a pen tip end E1 and a pen tail end E2, where the axle 124 and the base 1222 are disposed adjacent to the pen tail end E2, and the position of the third suction member 129 is relatively located on the other side and adjacent to the pen tip end E1. Under such arrangement, the pen holder 128 slides relatively along the pen tail end E2 to be aligned or misaligned with the axle 124, and as the third suction member 129 is adjacent to the pen tip end E1, it is ensured that the slender pen body does not unexpectedly rotate relative to the apparatus body 110.

Figure 5A:
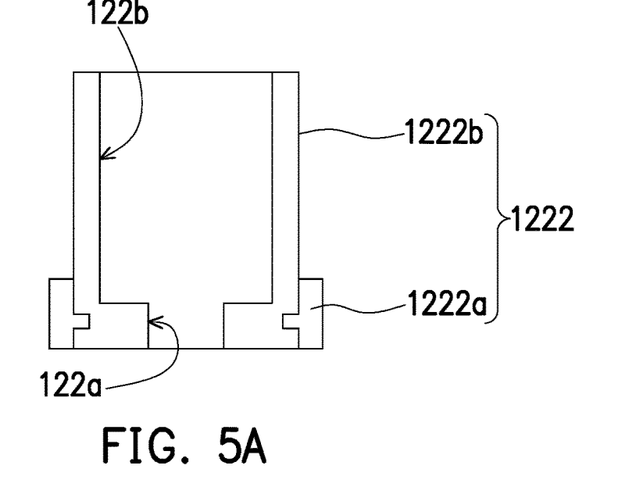
FIG. 5A is an enlarged view of a base of FIG. 2.
Figure 5B:
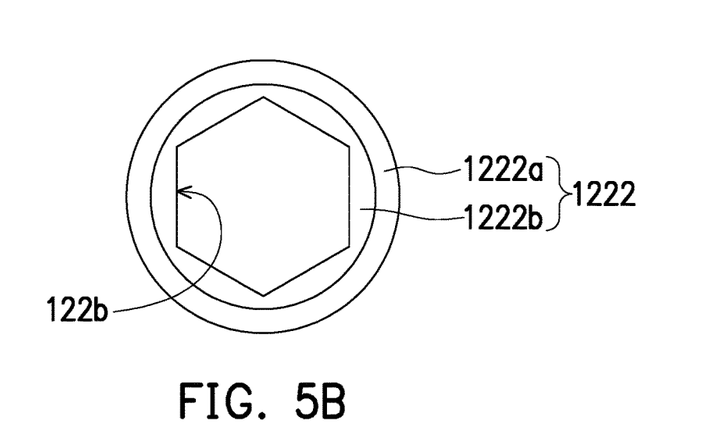
FIG. 5B is a top view of the base of FIG. 5A.
Figure 5C:
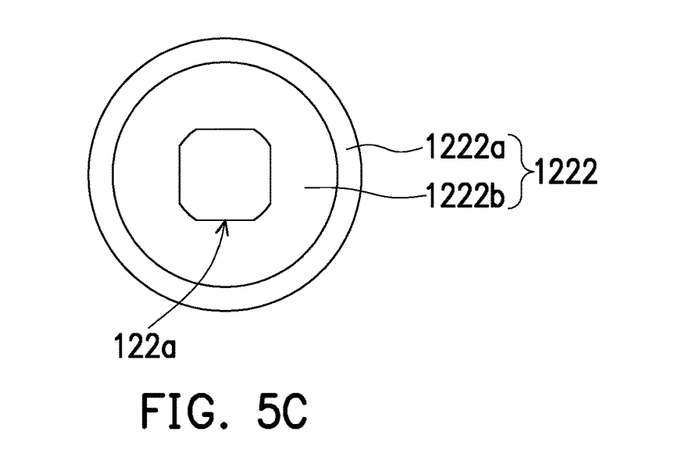
FIG. 5C is a bottom view of the base of FIG. 5A.

FIG. 5A is an enlarged view of the base of FIG. 2. FIG. 5B is a top view of the base of FIG. 5A. FIG. 5C is a bottom view of the base of FIG. 5A, which corresponds to the side of the opening 122a of the base 1222. Referring to FIG. 5A to FIG. 5C, the base 1222 of this embodiment includes a base body 1222a and a frame body 1222b. The base body 1222a is fixed to the main housing 1221. The frame body 1222b is rotatably connected to the base body 1222a, and is slidably arranged with the stop portion 124a of the axle 124 through a non-circular hole 122b thereof (shown as a hexagonal hole in FIG. 5B), where the stop portion 124a, for example, has a shape corresponding to the non-circular hole 122b. Therefore, the frame body 1222b and the axle 124 do not rotate relative to each other, and the frame body 1222b and the axle 124 may rotate together relative to the base body 1222a and the main housing 1221. In other embodiments, the base body 1222a and the frame body 1222b may be fixed to each other, and the axle 124 may rotate relative to the frame body 1222b, and a connection relationship thereof is not limited by the disclosure. In addition, in other embodiments, the base body 1222a may be omitted and the frame body 1222b may be directly arranged on the main housing 1221.

Figure 6:
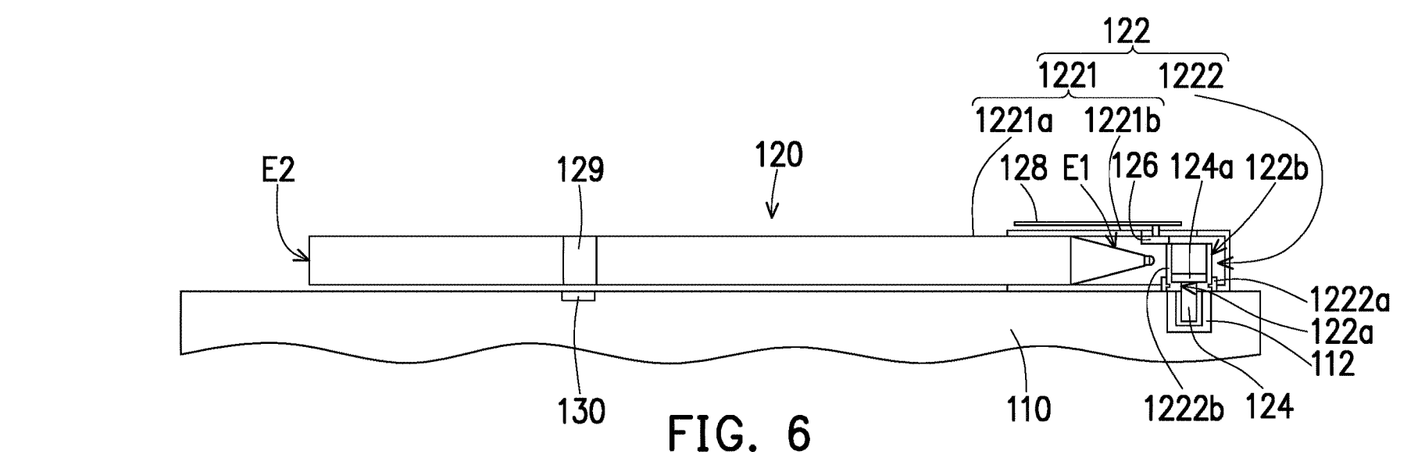
FIG. 6 is a partial schematic top view of an electronic apparatus according to a second embodiment of the disclosure.
Figure 7:
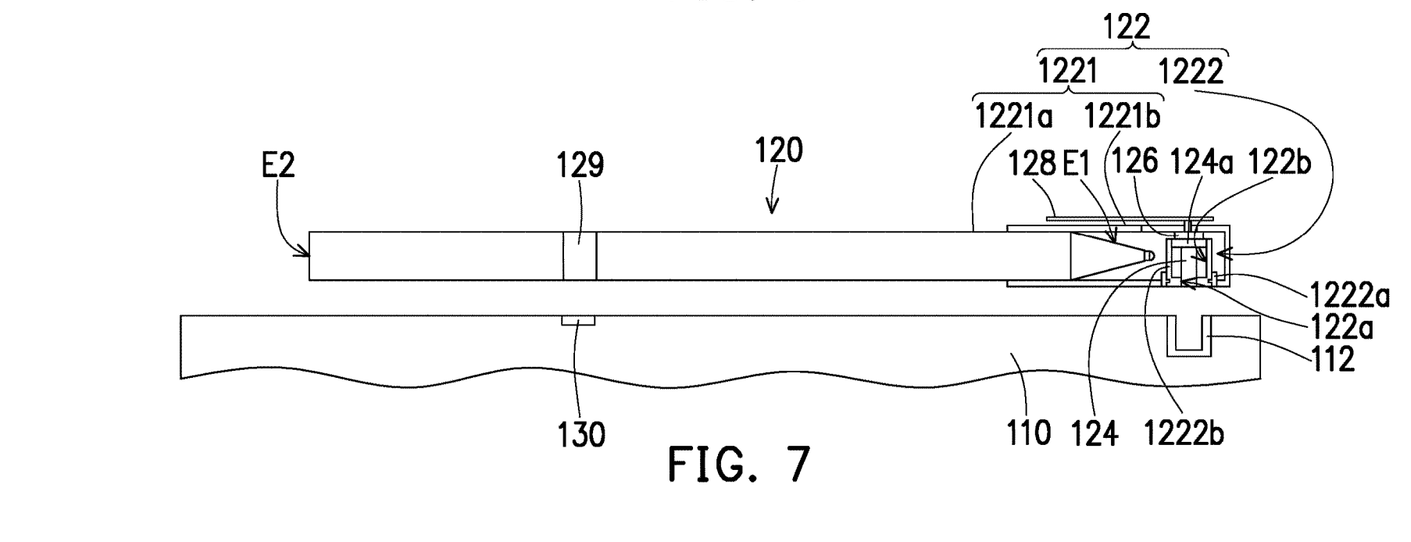
FIG. 7 illustrates separation of a functional assembly from an apparatus body of FIG. 6.

FIG. 6 is a partial schematic top view of an electronic apparatus according to a second embodiment of the disclosure. FIG. 7 illustrates separation of the functional assembly from the apparatus body of FIG. 6. The embodiment shown in FIG. 6 and FIG. 7 is almost the same in design as the embodiment shown in FIG. 2 and FIG. 3, and the only difference is that in the embodiment shown in FIG. 6 and FIG. 7, the main housing 1221 of the functional assembly 120 includes a pen body 1221a and a pen cap 1221b. The pen body 1221a has a pen tip end E1 and a pen tail end E2, and the pen cap 1221b may be selectively sleeved on one of the pen tip end E1 and the pen tail end E2. As shown in FIG. 6 and FIG. 7, the axle 124 and the base 1222 may be arranged on the pen cap 1221b, or the axle 124 and the base 1222 may be arranged on the pen body 1221a. If the axle 124 is disposed on the pen cap 1221b as shown in FIG. 6 and FIG. 7, positions of the second suction member 130 and the third suction member 129 are adjacent to the pen tail end E2 as shown in FIG. 6 and FIG. 7. On the contrary, in other embodiments, if the axle 124 is disposed on the pen body 1221a, the positions of the second suction member 130 and the third suction member 129 are adjacent to the pen tip end E1.

It should be noted that the first and second embodiments only show that the axle and the base may be selectively arranged on the main housing itself (the pen body shown in FIG. 2 and FIG. 3) or on an additional cap body (the pen cap shown in FIG. 6 and FIG. 7) according to a design need, and the same concept may also be applied to configure the axle and the base in the subsequent embodiments.

Figure 8:
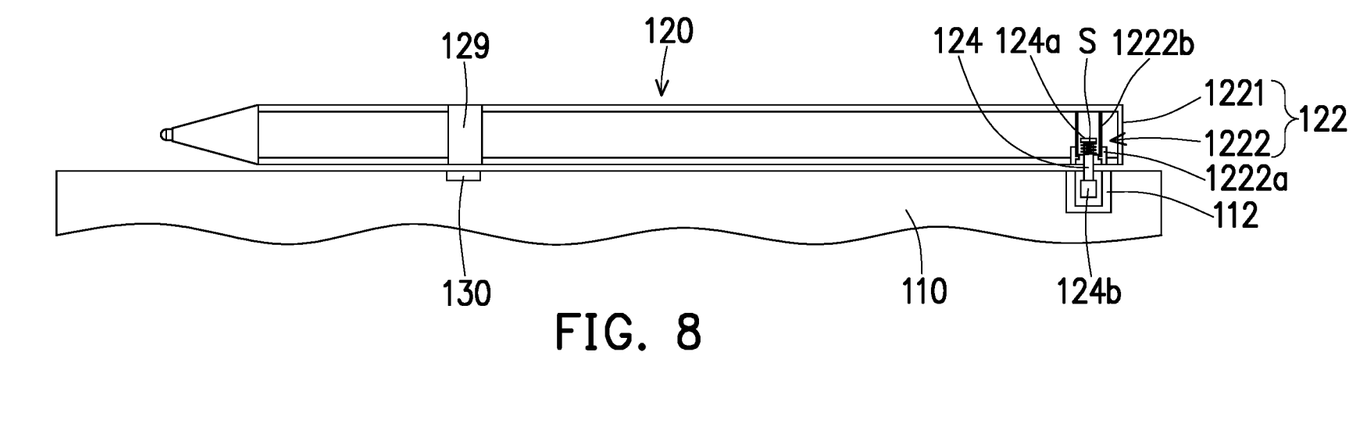
FIG. 8 is a partial schematic top view of an electronic apparatus according to a third embodiment of the disclosure.
Figure 9:
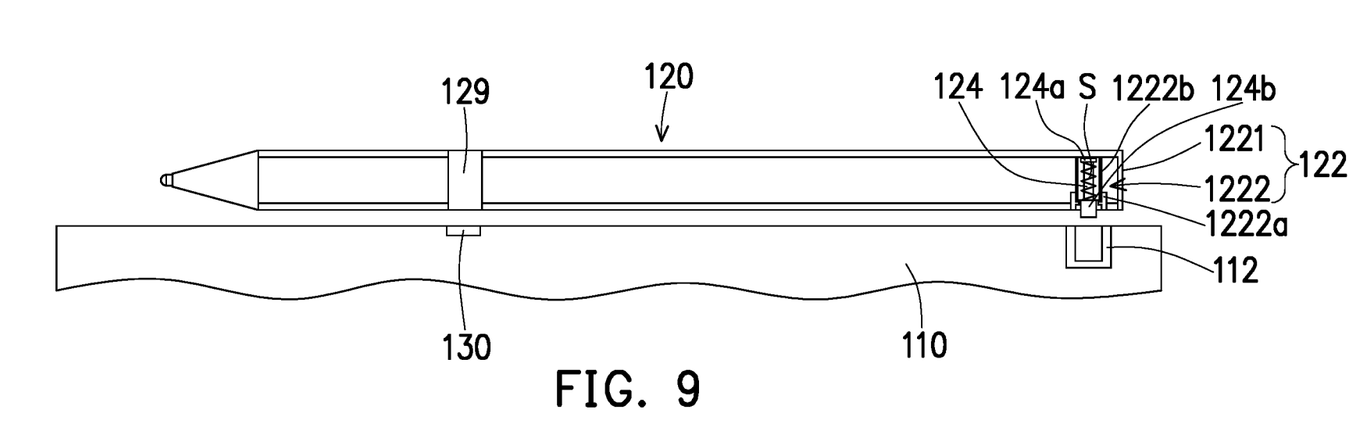
FIG. 9 illustrates separation of a functional assembly from an apparatus body of FIG. 8.

FIG. 8 is a partial schematic top view of an electronic apparatus according to a third embodiment of the disclosure. FIG. 9 illustrates separation of the functional assembly from the apparatus body of FIG. 8. Different from the means of misalignment between the first suction member 126 on the pen holder 128 and the axle 124 in the embodiment shown in FIG. 6 and FIG. 7 and the embodiment shown in FIG. 2 and FIG. 3, the functional assembly 120 shown in the embodiment of FIG. 8 and FIG. 9 further includes an elastic member S. The elastic element S is, for example, a spring, and is disposed between the main body 122 and the axle 124, which positions the axle 124 in the main body 122 as shown in FIG. 9 through an elastic force thereof. Due to the magnetic attraction between the axle 124 and the concave 112, the axle 124 is suitable for resisting the elastic force of the elastic member S to compress the elastic element S and protrude out of the main body 122 as shown in FIG. 8. When the axle 124 is far away from the concave 112, the axle 124 may be reset into the main body 122 as shown in FIG. 9 by the elastic force of the elastic member S.

In addition, in accordance with the situation of the third embodiment that the elastic member S is sleeved on the axle 124, the axle 124 of the third embodiment is also slightly different from the first and second embodiments in structure. To be specific, as shown in FIGS. 8 and 9, the axle 124 is further configured with a magnetic protrusion 124b, and the magnetic protrusion 124b is disposed on the other side relative to the stop portion 124a. Outer diameters of the magnetic protrusion 124b and the stop portion 124a are all larger than a diameter of the axle 124, so that the elastic member S is sleeved on the axle 124 and is located between the stop portion 124a and the magnetic protrusion 124b. In this way, after the axle 124 of the third embodiment compresses the elastic member S, the magnetic protrusion 124b protrudes out of the main body 122 and is combined with the concave 112 of the apparatus body 110.

Figure 10:
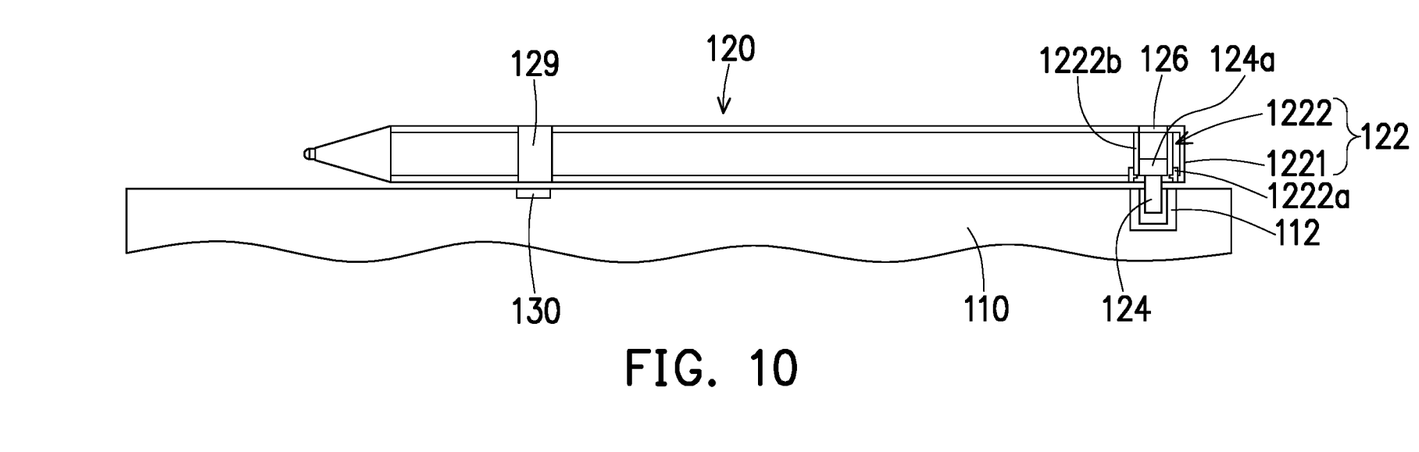
FIG. 10 is a partial schematic top view of an electronic apparatus according to a fourth embodiment of the disclosure.
Figure 11:
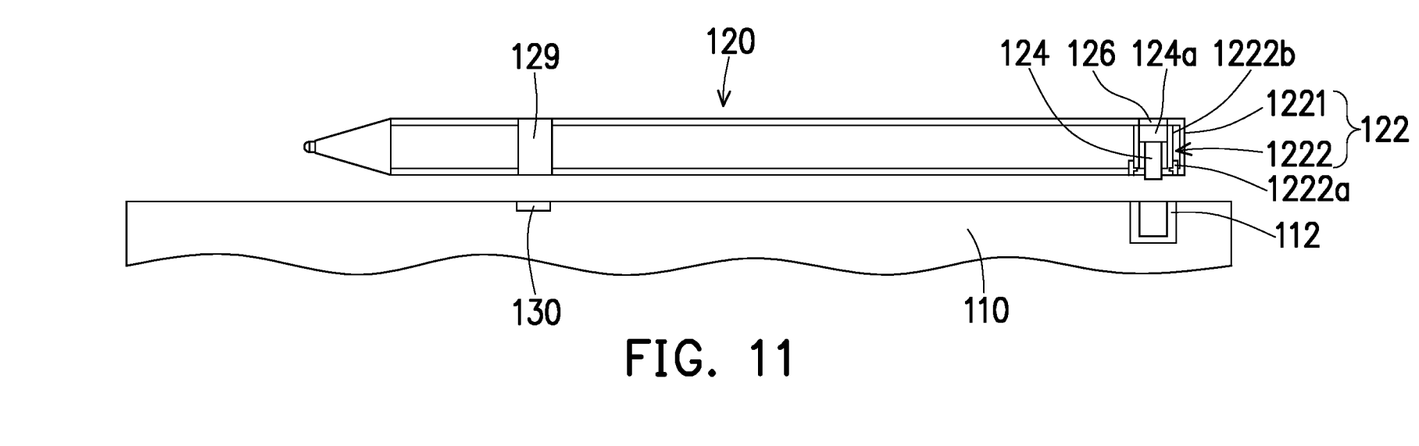
FIG. 11 illustrates separation of a functional assembly from an apparatus body of FIG. 10.

FIG. 10 is a partial schematic top view of an electronic apparatus according to a fourth embodiment of the disclosure. FIG. 11 illustrates separation of the functional assembly from the apparatus body of FIG. 10. A main difference between the embodiment shown in FIG. 10 and FIG. 11 and the embodiment shown in FIG. 2 and FIG. 3 is that, in the embodiment shown in FIG. 10 and FIG. 11, the first suction member 126 is directly disposed on the main housing 1221 of the main body 122, instead of being disposed on the pen holder 128 as shown in FIGS. 2 and 3. In this way, in the fourth embodiment, the first suction member 126 disposed on the main housing 1221 may also prevent the axle 124 from unexpectedly protruding out of the main body 122.

Figure 12:
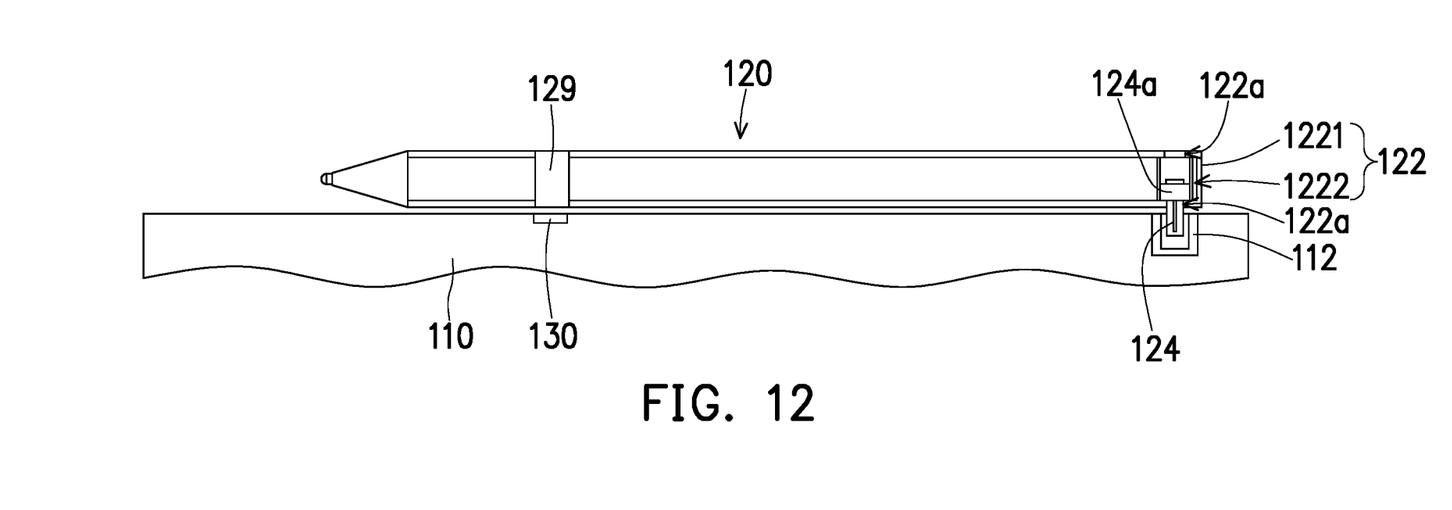
FIG. 12 is a partial schematic top view of an electronic apparatus according to a fifth embodiment of the disclosure.
Figure 13:
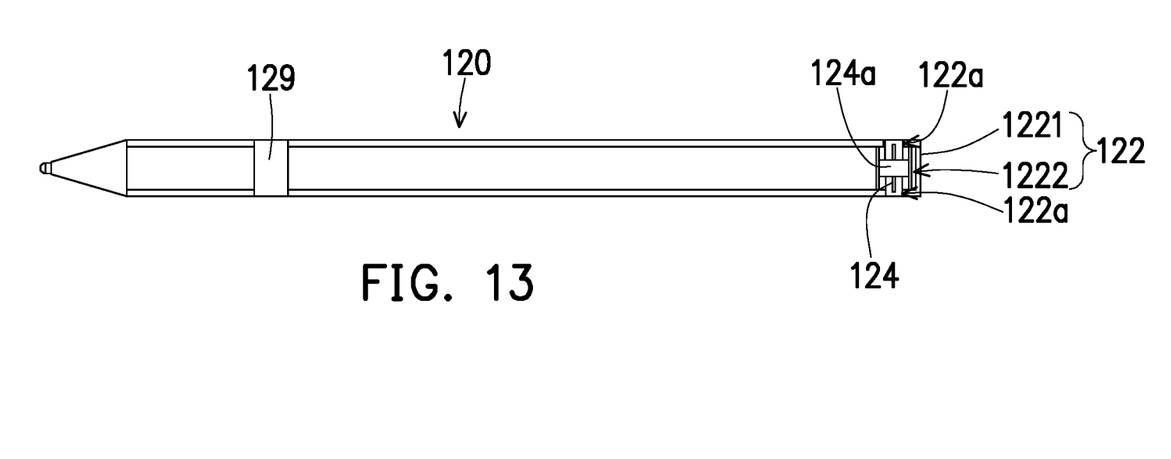
FIG. 13 illustrates separation of a functional assembly from an apparatus body of FIG. 12.
Figure 14:
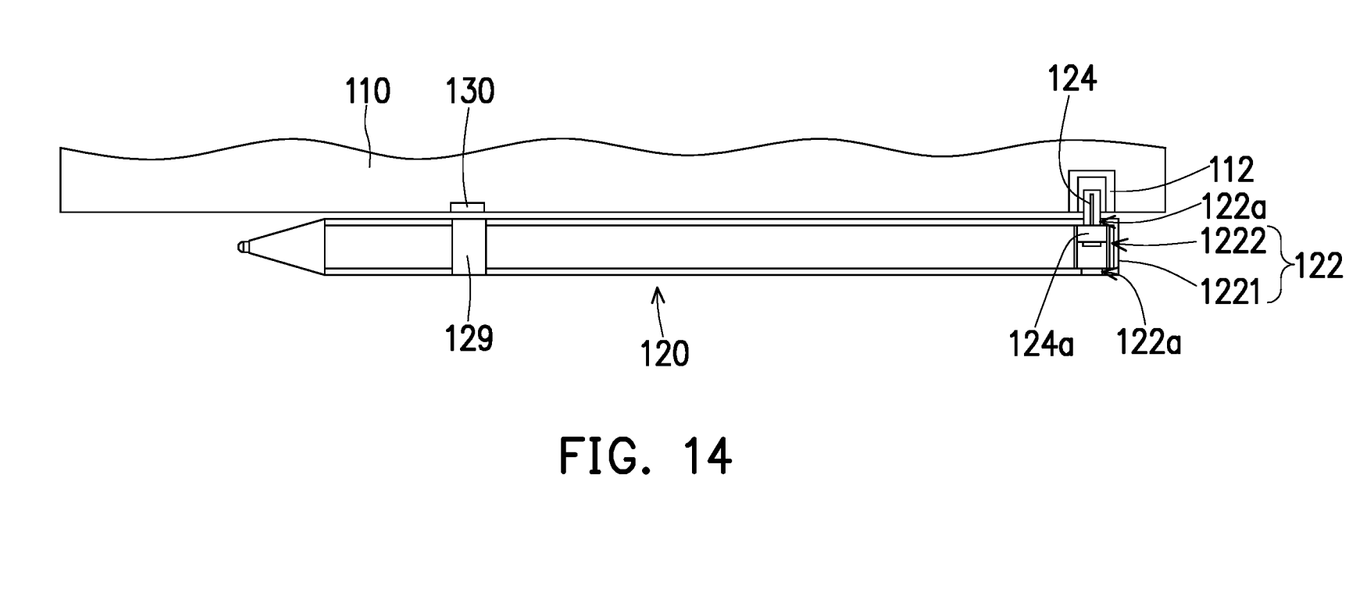
FIG. 14 illustrates protrusion of an axle of FIG. 12 out of a main body in a different direction.

FIG. 12 is a partial schematic top view of an electronic apparatus according to a fifth embodiment of the disclosure. FIG. 13 illustrates separation of the functional assembly from the apparatus body of FIG. 12. FIG. 14 illustrates protrusion of the axle of FIG. 12 out of the main body in a different direction. A main difference between the embodiment of FIG. 12 to FIG. 14 and the embodiment of FIG. 2 and FIG. 3 is that, in the embodiment of FIG. 12 to FIG. 14, the main body 122 has two opposite openings 122a, and the axle 124 may protrude out of the main body 122 through one of the two openings 122a and be connected to the concave 112 of the apparatus body 110 as shown in FIG. 12 and FIG. 14. The stop portion 124a of the axle 124 is, for example, slidably connected to the main body of the axle 124, so as to operate between the states shown in FIG. 12 to FIG. 14 through sliding of the stop portion 124a relative to the main body of the axle 124.

Figure 15:
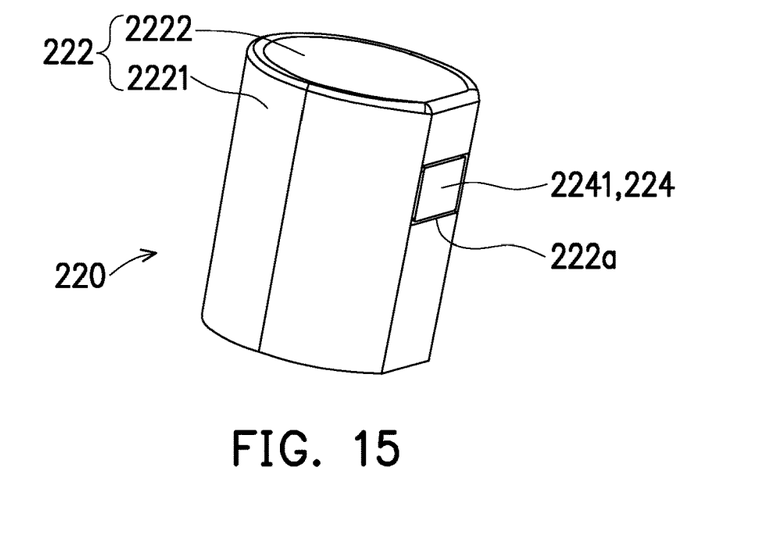
FIG. 15 is a partial three-dimensional view of a functional assembly according to a sixth embodiment of the disclosure.
Figure 16:
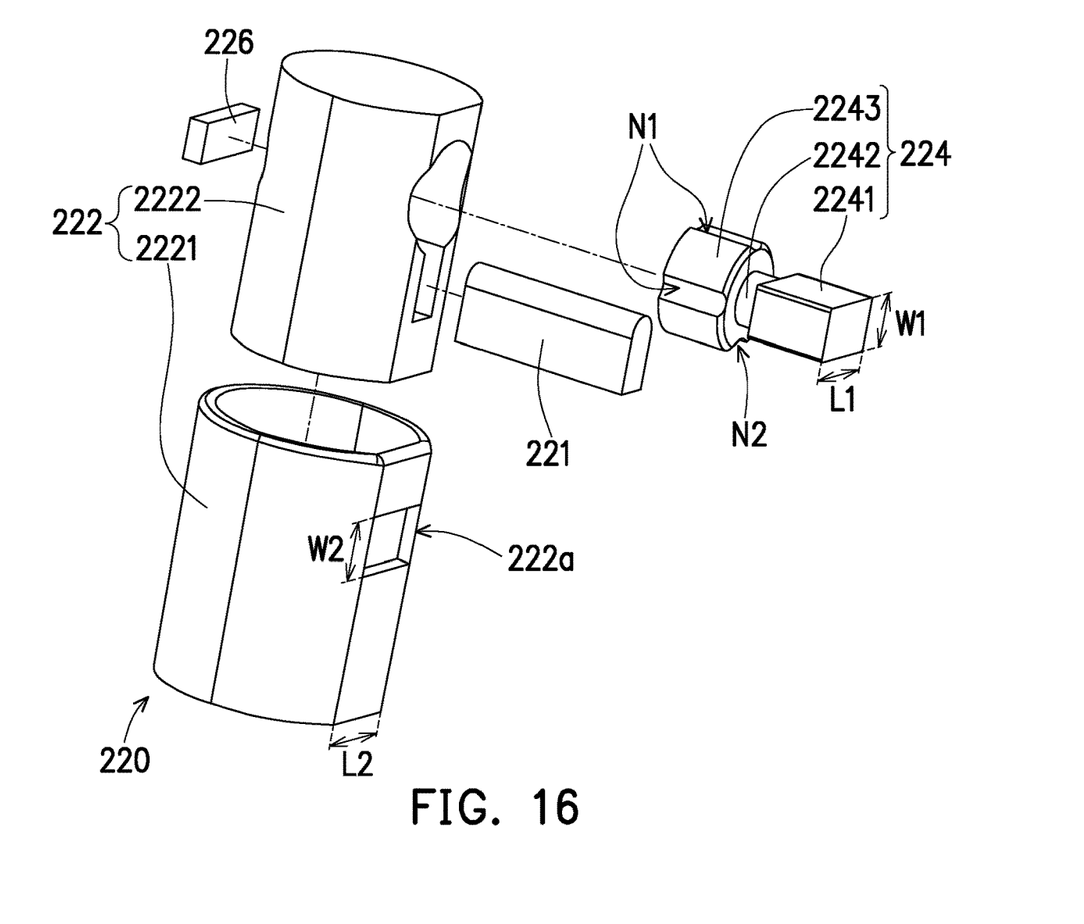
FIG. 16 is an exploded view of the functional assembly of FIG. 15.

FIG. 15 is a partial three-dimensional view of a functional assembly according to a sixth embodiment of the disclosure. FIG. 16 is an exploded view of the functional assembly of FIG. 15. In the functional assembly 220 shown in FIG. 15 and FIG. 16, configurations and functions of a main body 222, a main housing 2221, a base 2222, an opening 222a, an axle 224, and a first suction member 226 are similarly to the configurations and functions of the main body 122, the main housing 1221, the base 1222, the opening 122a, the axis 124, and the first suction member 126 of the previous embodiment, and details thereof are not be repeated. A main difference between the functional assembly 220 of the sixth embodiment and the functional assembly 120 of the other embodiments is that the functional component 220 of the sixth embodiment includes a positioning member 221, and the positioning member 221 is disposed in a base 2222. Correspondingly, the axle 224 further has a plurality of positioning concaves N1 and a concession concave N2, and functions thereof are described in detail below.

Figure 17:
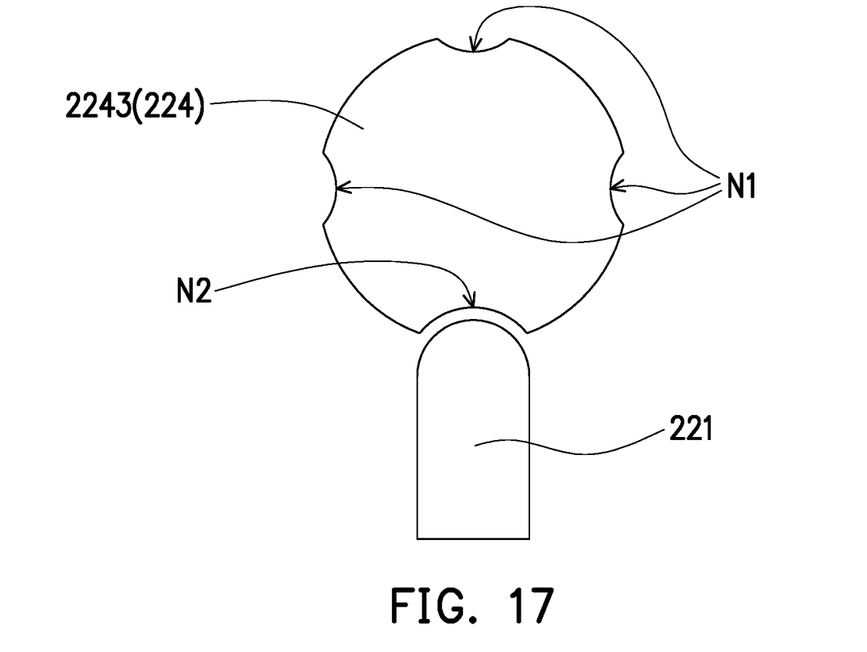
FIG. 17 illustrates a concession concave of FIG. 16 corresponding to a positioning member.
Figure 18:
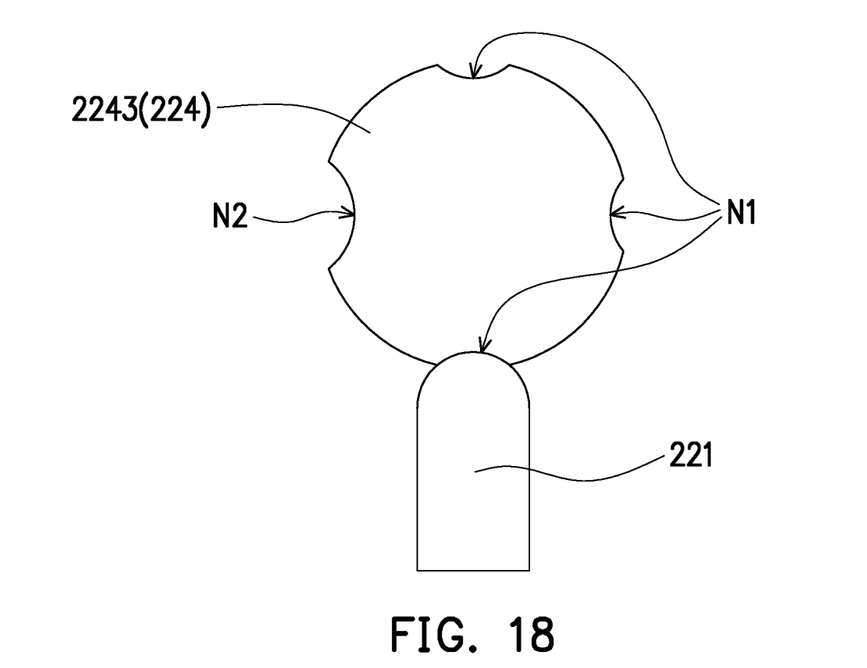
FIG. 18 illustrates a positioning concave of FIG. 16 corresponding to the positioning member.
Figure 19A:
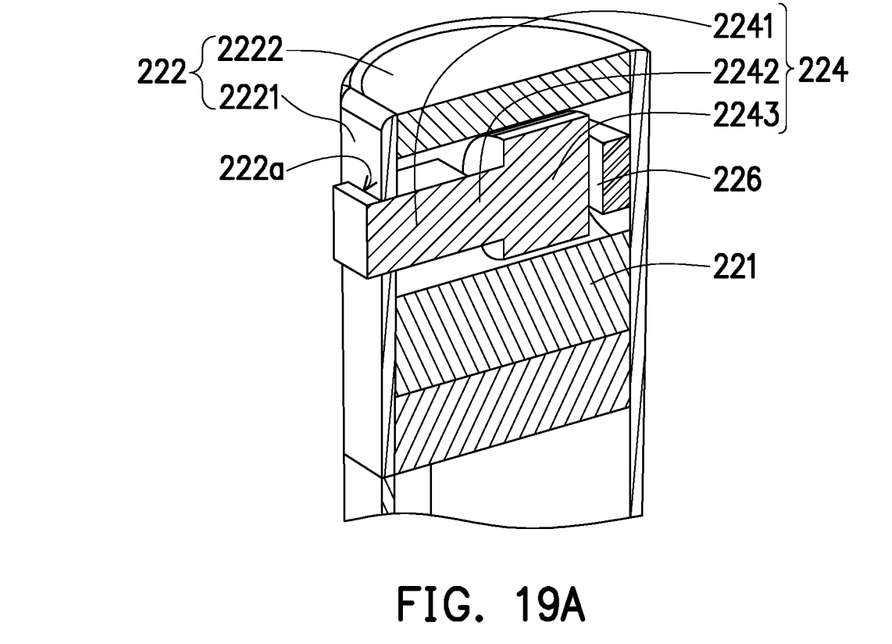
FIG. 19A is a partial three-dimensional view of the functional assembly of FIG. 15.
Figure 19B:
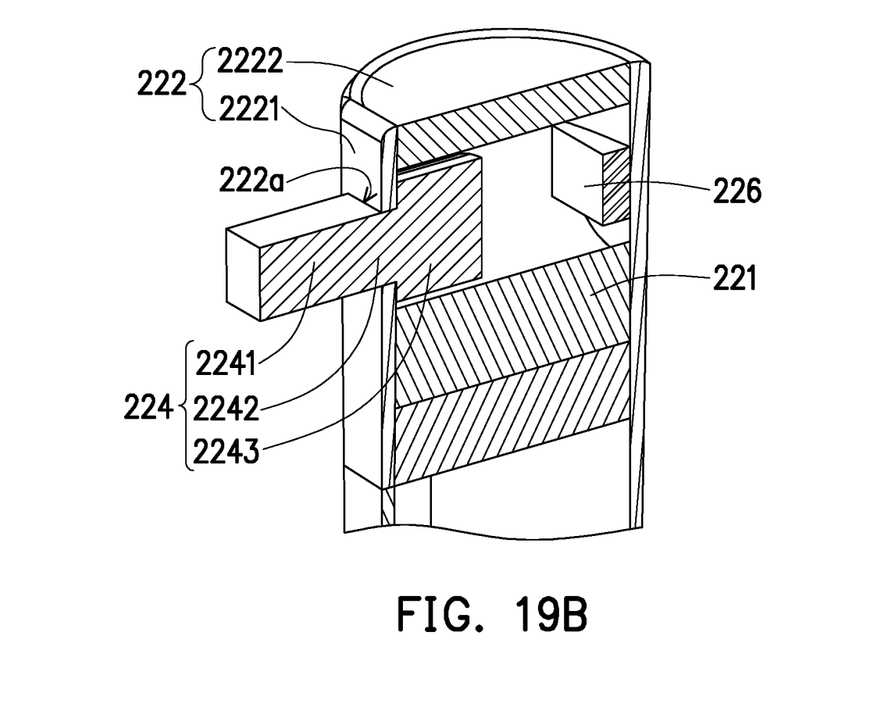
FIG. 19B illustrates protrusion of a part of an axle of FIG. 19A out of the main body.

FIG. 17 illustrates the concession concave of FIG. 16 corresponding to a positioning member. FIG. 18 illustrates the positioning concave of FIG. 16 corresponding to the positioning member. FIG. 19A is a partial three-dimensional view of the functional assembly of FIG. 15. FIG. 19B illustrates protrusion of a part of the axle of FIG. 19A out of the main body. When the concession concave N2 corresponds to the positioning member 221 along with the relative rotation of the axle 224 and the main body 222 as shown in FIG. 17, the axle 224 does not lean against the positioning member 221 due to concession of the concession concave N2, such that the axle 224 may be slid between the inside of the main body 222 and the outside of the main body 222 as shown in FIG. 19A and FIG. 19B. When a part of the axle 224 protrudes to the outside of the main body 222 as shown in FIG. 19B and is combined with the concave of the apparatus body (for example, the concave 112 of the apparatus body 110 shown in FIG. 2), as the user applies a force to the main body 222, the axle 224 is adapted to rotate relative to the main body 222, such that any one of the positioning concaves N1 is positioned to the positioning member 221 as shown in FIG. 18 to fix a relative rotation angle of the axle 224 and the main body 222. A material of the positioning member 221 may be an elastic material, so as to provide a good positioning effect through its elastic force.

Referring to FIG. 16, in detail, the axle 224 of the embodiment includes a protruding section 2241, a neck section 2242, and a positioning section 2243. The neck section 2242 is connected between the protruding section 2241 and the positioning section 2243, and the positioning concave N1 and the concession concave portion N2 are formed in the positioning section 2243. The opening 222a of the main body 222 is, for example, a rectangular opening, and the protruding section 2241 has a rectangular cross-section corresponding to the rectangular opening, where a length L1 (shown in FIG. 16) of the protruding section 2241 is less than or equal to a length L2 (shown in FIG. 16) of the opening 222a and greater than a width W2 (shown in FIG. 16) of the opening 222a, and a width W1 (shown in FIG. 16) of the protruding section 2241 is less than or equal to the width W2 of the opening 222a, such that the protruding section 2241 needs to rotate to a specific state in order to protrude out of the main body 222. The specific state, for example, corresponds to the state where the concession concave N2 shown in FIG. 17 corresponds to the positioning member 221.

An outer diameter of the neck section 2242 is less than an outer diameter of the protruding section 2241 and an outer diameter of the positioning section 2243. Therefore, the neck section 2242 has a sufficiently small outer diameter to rotate in the opening 222a of the main body 222 in the state shown in FIG. 19B. In addition, the outer diameter of the positioning section 2243 is, for example, larger than an aperture of the opening 222a to prevent the axle 224 from being separated from the main body 222. That is, the positioning section 2243 may provide a stopping effect similar to that provided by the stop portion 124a of the aforementioned embodiments.

It should be noted that in the sixth embodiment (referring to FIG. 16 and FIGS. 19A-19B), a function of the first suction member 226 of the base 2222 is the same as that of the first suction member 126 of the third embodiment (referring to FIG. 10). As shown in FIG. 19, the positioning section 2243 of the axle 224 and the first suction member 226 are magnetically attracted to each other, so as to prevent the protruding section 2241 of the axle 224 from unexpectedly protruding out of the main body 222.

In view of the foregoing, in the electronic apparatus of the disclosure, the functional assembly is rotatably connected to the concave of the apparatus body via the axle. Accordingly, when the functional assembly is connected to the apparatus body and blocks the functional part (such as a connector slot) of the apparatus body, a user may rotate the functional assembly relative to the apparatus body to prevent the functional part from being blocked by the functional assembly without separating the functional assembly from the apparatus body, so as to avoid the inconvenience in use due to that the apparatus body is blocked by the functional assembly.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic apparatus, comprising:
an apparatus body, having a concave; and
a functional assembly, comprising a main body and an axle, wherein the axle is slidably disposed in the main body, and a part of the axle is adapted to protrude out of the main body to be combined with concave,
wherein when the part of the axle is combined with the concave, the main body is adapted to rotate relative to the apparatus body by treating the axle as a rotation axis.

2. The electronic apparatus according to claim 1, wherein the concave is an anti-theft lock hole of the apparatus body.

3. The electronic apparatus according to claim 1, wherein the functional assembly is a stylus, a camera apparatus, or a flash drive.

4. The electronic apparatus according to claim 1, wherein the main body comprises a main housing and a base, the base is fixed to the main housing, and the axle is rotatably arranged in the base and is adapted to protrude from the base.

5. The electronic apparatus according to claim 1, wherein the main body has at least one opening, the axle is adapted to protrude from the main body through the at least one opening, the axle has a stop portion, and an outer diameter of the stop portion is larger than an aperture of the at least one opening to prevent the axle from being separated from the main body.

6. The electronic apparatus according to claim 1, wherein a material of one of the concave and the axle comprises a magnet, and a material of the other one of the concave and the axle comprises a magnet or a metal that is adapted to be magnetically attracted.

7. The electronic apparatus according to claim 6, wherein the functional assembly comprises a first suction member suitable for magnetically attracting the axle,
wherein a material of the first suction member comprises a magnet or a metal that is adapted to be magnetically attracted, and a magnetic attraction force between the first suction member and the axle is less than a magnetic attraction force between the concave and the axle.

8. The electronic apparatus according to claim 7, wherein the functional assembly comprises a pen holder, the pen holder is slidably arranged on the main body, and the first suction member is connected to the pen holder and is suitable for being aligned or misaligned with the axle as the pen holder relatively slides along the main body.

9. The electronic apparatus according to claim 7, wherein the first suction member is arranged on a main housing of the main body, and when the axle is away from the concave, the axle and the first suction member are magnetically attracted to each other.

10. The electronic apparatus according to claim 1, further comprising a second suction member, wherein the second suction member is disposed on the apparatus body, the functional assembly comprises a third suction member, the third suction member is disposed on the main body, and the second suction member and the third suction member are magnetically attracted to each other, wherein when the axle is combined with the concave, the main body is adapted to rotate by treating the axle as a rotation axis such that the second suction member and the third suction member are aligned or misaligned with each other.

11. The electronic apparatus according to claim 10, wherein the main body comprises a pen body and a pen cap, the pen body has a pen tip end and a pen tail end, and the pen cap is selectively sleeved on one of the pen tip end and the pen tail end,
wherein if the axle is arranged on the pen body, a position of the third suction member is adjacent to the pen tip end,
wherein if the axle is disposed on the pen cap, the position of the third suction member is adjacent to the pen tail end.

12. The electronic apparatus according to claim 1, wherein the functional assembly comprises an elastic member, the elastic member is arranged between the main body and the axle, the axle is adapted to resist an elastic force of the elastic member to protrude out of the main body, and the axle is adapted to be reset into the main body through the elastic force of the elastic member.

13. The electronic apparatus according to claim 1, wherein the main body has two opposite openings, and the axle is adapted to protrude out of the main body through any one of the two openings.

14. The electronic apparatus according to claim 5, wherein the functional assembly comprises a positioning member, the positioning member is disposed in the base, the axle has a plurality of positioning concaves, and the axle is adapted to rotate relative to the main body such that any one of the positioning concaves is positioned to the positioning member to fix a relative rotation angle between the axle and the main body.

15. The electronic apparatus according to claim 14, wherein a material of the positioning member comprises an elastic material.

16. The electronic apparatus according to claim 14, wherein the axle comprises a protruding section, a neck section, and a positioning section, the neck section is connected between the protruding section and the positioning section, the protruding section is adapted to protrude out of the main body, the positioning concaves are formed in the positioning section, and an outer diameter of the neck section is smaller than an outer diameter of the protruding section and an outer diameter of the positioning section.

17. The electronic apparatus according to claim 16, wherein the main body has an opening, the protruding section is adapted to protrude from the main body through the opening, a length of the protruding section is less than or equal to a length of the opening and greater than a width of the opening, and a width of the protruding section is less than or equal to the width of the opening.

18. The electronic apparatus according to claim 16, wherein the main body has an opening, the protruding section is adapted to protrude from the main body through the opening, and an outer diameter of the positioning section is larger than an aperture of the at least one opening to prevent the axle from being separated from the main body.

19. The electronic apparatus according to claim 14, wherein the axle has a concession concave, and when the concession concave corresponds to the positioning member along with relative rotation of the axle and the main body, the axle is adapted to slide between inside of the main body and outside of the main body.

* * * * *